(12) United States Patent
Edelmann et al.

(10) Patent No.: US 6,276,830 B1
(45) Date of Patent: Aug. 21, 2001

(54) LINEAR GUIDE ASSEMBLY WITH POSITIVELY GUIDED CAGE

(75) Inventors: Ludwig Edelmann, Sulzthal; Andreas Geyer, Mainburg; Hermann Glöckner; Georg Hierl, both of Schweinfurt; Holger Kristandt, Euerbach; Uwe Mayer, Münnerstadt; Henryk Velde, Werneck; Lothar Walter, Schweinfurt, all of (DE)

(73) Assignee: SKF Linearsysteme GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/288,100

(22) Filed: Apr. 7, 1999

(30) Foreign Application Priority Data

Apr. 7, 1998 (DE) .............................. 198 15 525

(51) Int. Cl.[7] ...................................................... F16C 29/04
(52) U.S. Cl. .............................. 384/51; 74/465; 74/110; 384/47
(58) Field of Search ................................. 384/47, 48, 49, 384/51, 57; 74/465

(56) References Cited

U.S. PATENT DOCUMENTS

| 2,294,665 | * | 9/1942 | Jackson | 384/47 |
| 5,076,715 | * | 12/1991 | Saoyama et al. | 384/49 |
| 5,427,454 | * | 6/1995 | Tsuboi | 384/47 |
| 5,607,238 | * | 3/1997 | Sherman | 384/49 |

FOREIGN PATENT DOCUMENTS 1 192 462  12/1959 (DE).

* cited by examiner

*Primary Examiner*—Thomas R. Hannon
(74) *Attorney, Agent, or Firm*—Eugene E. Renz, Jr., PC

(57) ABSTRACT

Linear guide assembly comprising at least two guide rails, which are moveable in the longitudinal direction with respect to each other and have prismatic shaped raceways, a plurality of rolling elements guided in a cage, at least one gear wheel for the positive guidance of the cage is connected to the cage, which wheel engages in toothed racks, each of which is connected to a guide rail, the gear wheel comprising a disk, having axial projections distributed around the periphery at least one of the end surfaces and rows of uniformly spaced recesses, into which the projections on the disk can engage.

11 Claims, 5 Drawing Sheets

LINEAR GUIDE ASSEMBLY WITH POSITIVELY GUIDED CAGE

BACKGROUND OF THE INVENTION

The invention pertains to linear guide assemblies of the type having two guide rails, which can be moved with respect to each other in the longitudinal direction and having prismatic or similarly designed raceways, on which rolling elements, guided in a cage, can roll. At least one gear wheel connected to the cage is provided, which engages in toothed racks or the like, each of which is connected to a guide rail for positive guidance of the cage.

To prevent the cage from wandering as a result of external influences such as nonuniform clamping or as a result of internal influences such as very small deviations in the shape of the raceways, it is known in the field of linear guides that the cage can be positively guided with respect to the guide rails. For this purpose, the cage is provided with gear wheels, which engage in racks installed between the guideways (DE-PS 1,192,462). In these known designs, the racks are made as separate parts, which must be attached to the guide rails or their supports by screws. This is complicated and expensive. There is also the problem of fitting these toothed racks into standard designs with standardized dimensions.

SUMMARY OF THE INVENTION

It is therefore the task of the present invention to provide a linear guide assembly of the general type described above with positive guidance of the cage, which is characterized by fewer individual parts and obviates the need for additional fastening means.

To this end, in accordance with the present invention the gear wheel consists of a disk having axial projections on at least one of the lateral surfaces distributed around the periphery thereof, and providing rows of uniformly spaced recesses in the guide rods into which the projections on the disk can engage.

As a result of the projections on the end surfaces of the disk of the gear wheel, which are preferably arranged near the outside circumference of the disk, the recesses can be machined into the corner areas of the raceways wherein we assume the guide rails are of prismatic design. This means not only that separate toothed racks and their fastening means can be eliminated but also that nothing is taken away from the load-bearing width of the raceways. In accordance with another feature of the invention, the projections are designed as portions of a sphere, as a result of which they are better able to engage in the recesses in the guide rails. In accordance with another feature of the invention, the guide rails are preferably designed as hollow, spherical shapes. In addition to the projections on the end surfaces, it is quite possible to provide the disk with teeth on its lateral surface as well, the spacing of which would be the same as that of the projections.

The recesses in the guide rails, which, according to additional features of the invention, can be provided either over the entire length of the guide rails or only over parts of it, can be produced either by plastic deformation such as a rolling or pressing operation or by a cutting method such as erosion, milling, etc. The recesses do not have to be very deep, which means that the cross sections of the guide rails are not weakened significantly and are therefore not at risk of fracture. Thus, a compact and simple construction is obtained, because there is no need for the attachment of separate toothed racks or the like.

According to additional features of the invention, the gear wheel can be installed in one of the pockets of the cage or in a separate housing, which can be arranged between sections of the cage or at the ends of the cage.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
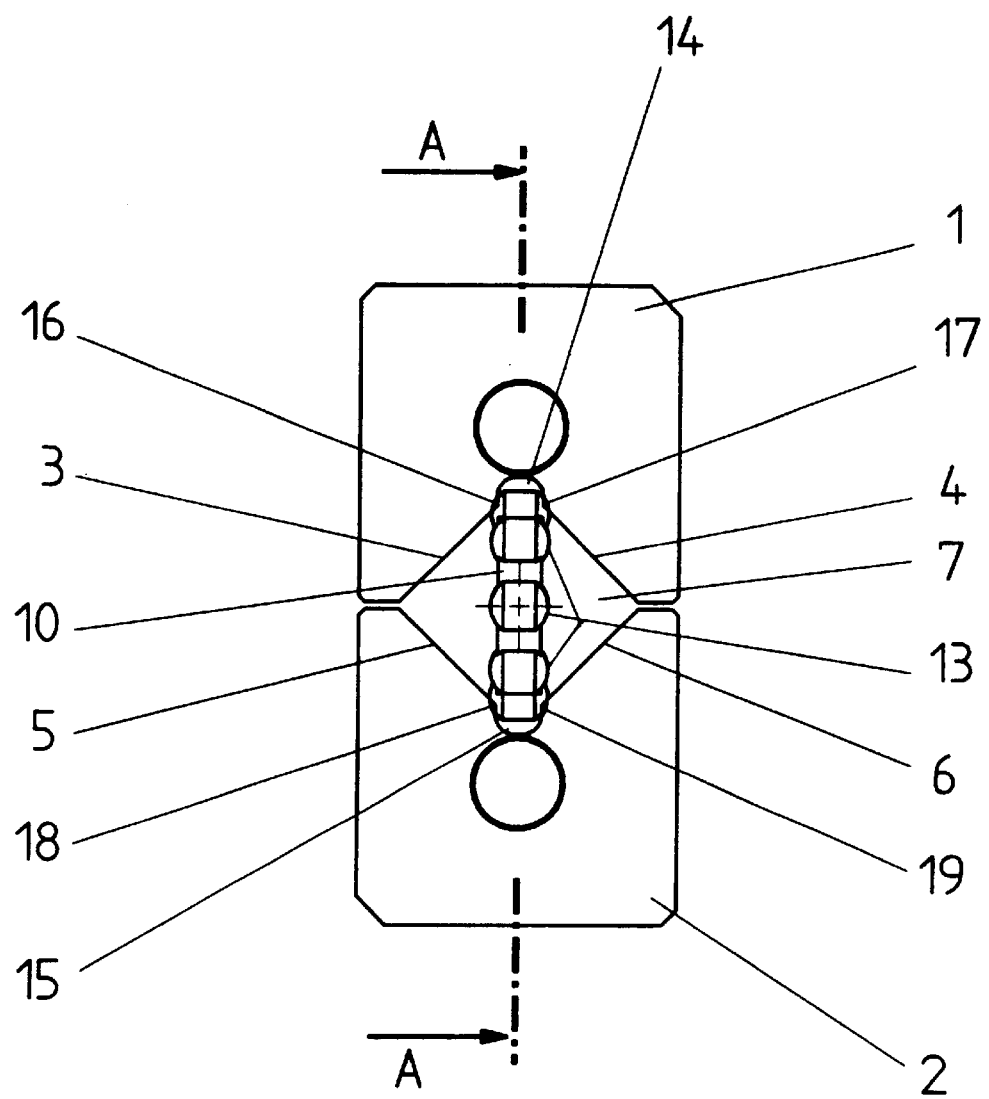
FIG. 1 shows a cross section through a linear guide according to the invention.
Figure 2:
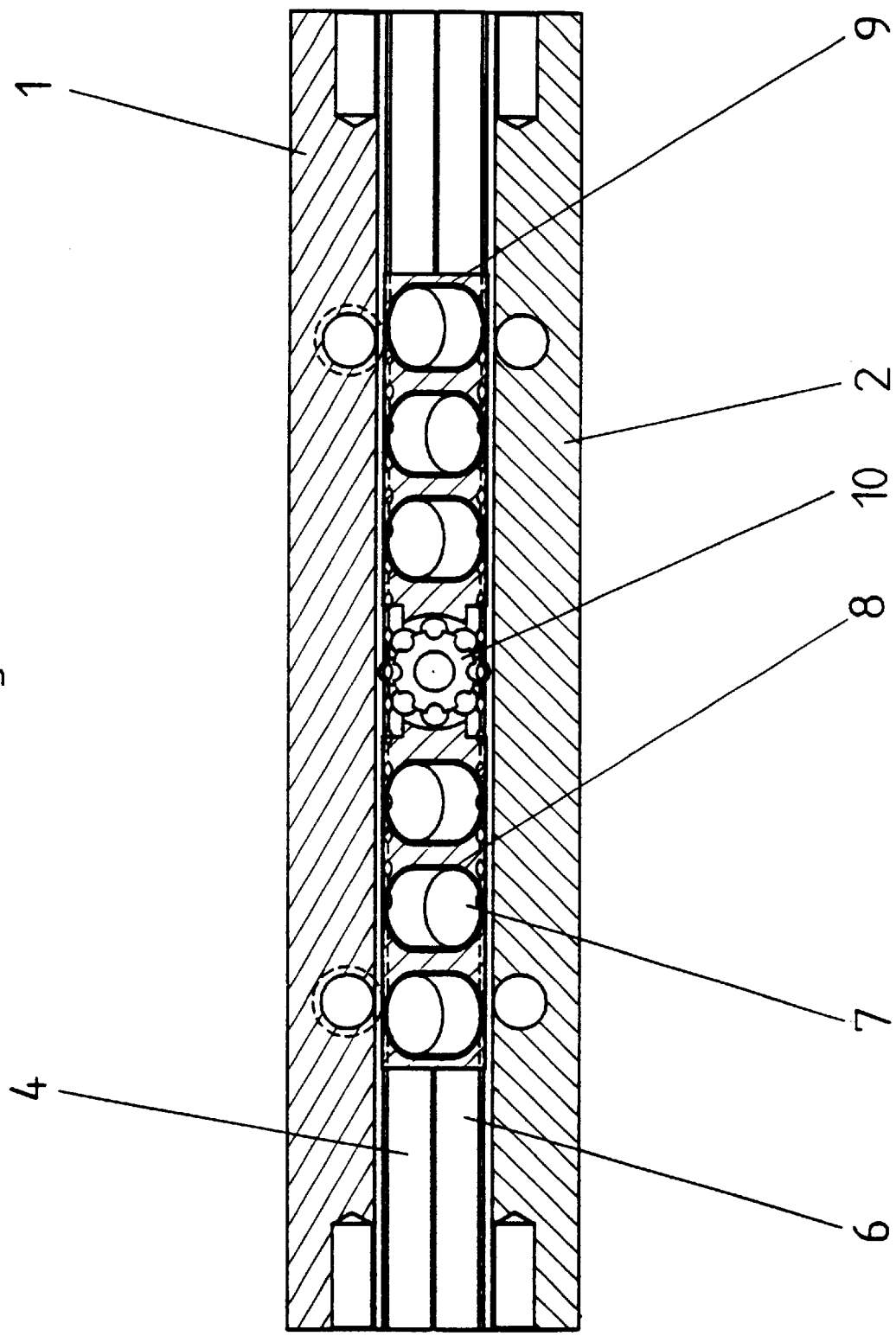
FIG. 2 shows a partial view of a longitudinal cross section along line A—A of FIG. 1.

Referring now to the drawings and particularly to FIG. 1, thereof, in FIG. 14, there is shown a linear guide assembly in accordance with the present invention comprising upper and lower guide rails 1 and 2 each of which has two prismatically shaped raceways 3, 4, 5, and. Rollers 7 are disposed between the prismatic raceways, which are arranged crosswise in alternate directions, one roller 7 thus contacting raceways 3 and 6, the next adjacent 7 roller contacting raceways 4 and 5, to transfer the forces applied to the linear guide assembly. The rollers 7 are held in pockets 8 of a cage 9. In one of pockets 8 of cage 9, a gear wheel 10 is installed, which consists of a disk 11, on which axial projections 13 are provided, which are distributed uniformly around the outside circumference 12.

Figure 3:
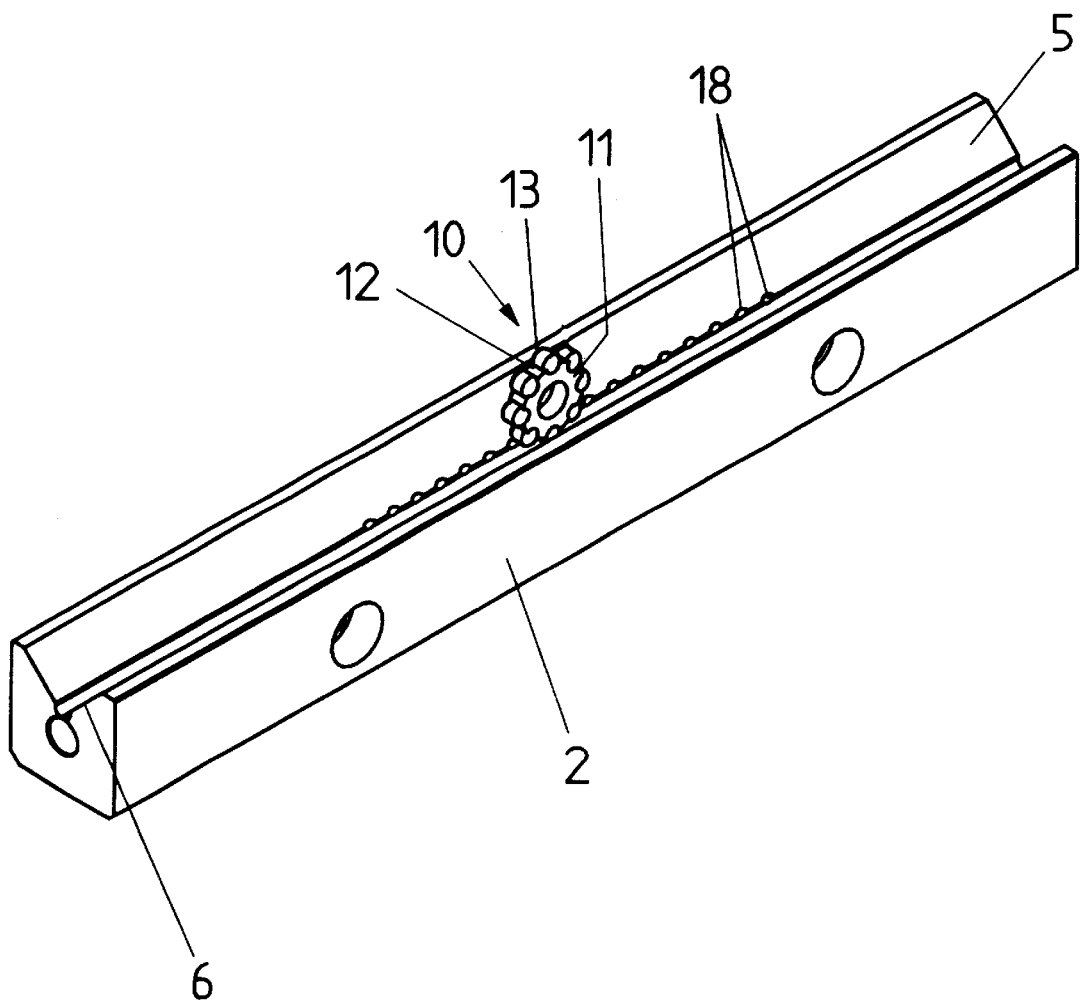
FIG. 3 shows a plan view, in perspective, of the lower guide rail according to FIGS. 1 and 2.
Figure 4:
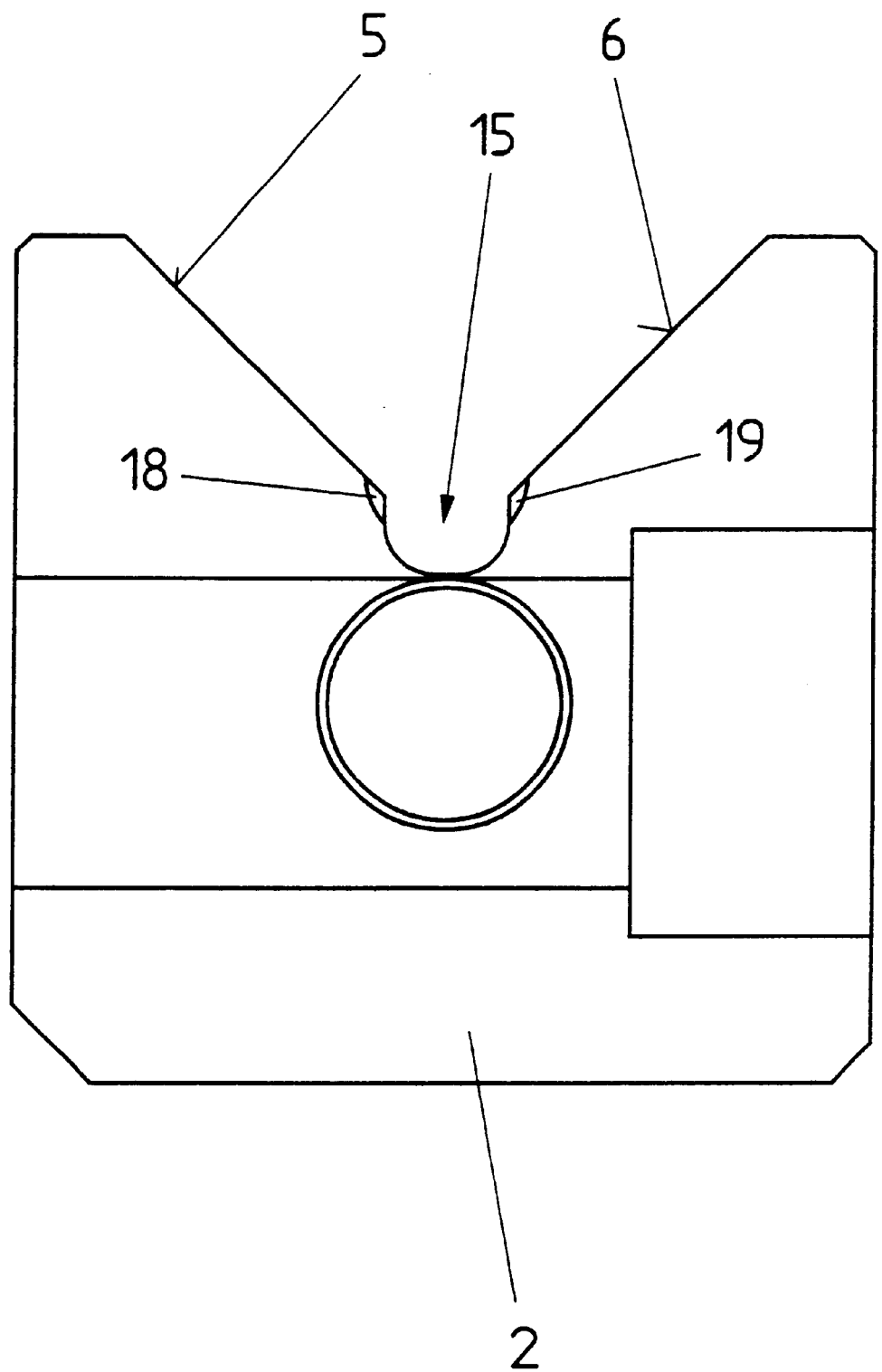
FIG. 4 shows an enlarged end view of the lower guide rail according to FIG. 3.

Each of the two guide rails 1, 2 is provided with a longitudinal groove 14, 15 at the intersections between the raceways 3, 4, 5, 6. Recesses 16, 17, 18, 19 are machined equal distances apart into the transition regions between raceways 3, 4; 5, 6 and longitudinal grooves 14, 15 (see FIGS. 1 and 3). The shape of recesses 16, 17, 18, 19 corresponds to the external shape of projections 13 and into which projections 13 can engage. Projections 13 thus mesh with recesses 16–19, so that, when guide rails 1 and 2 move with respect to each other, cage 9 is positively guided.

Figure 5:
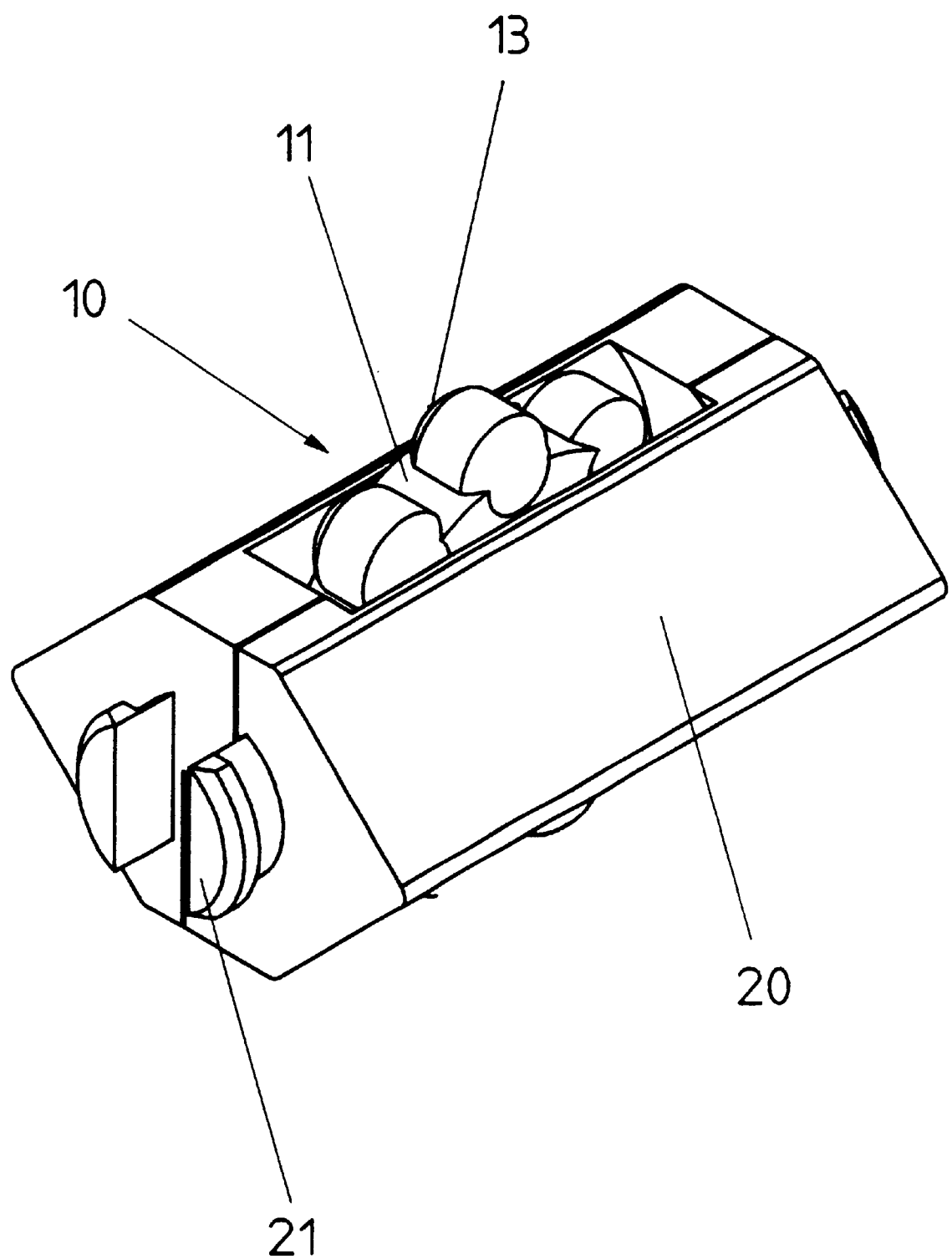
FIG. 5 shows a plan view, in perspective, of a different exemplary embodiment, in which the gear wheel is installed in a separate housing.

In the exemplary embodiment according to FIG. 5, gear wheel 10 is installed in a separate housing 20, the external contour of which conforms to the prismatic shape of the raceways (not shown). Both ends of this housing 20 are provided with connecting means 21, which can be used to connect housing 20 to the cage (not shown).

Even though particular embodiments of the present invention have been illustrated and described herein, it is not intended to limit the invention and changes and modifications may be made therein within the scope of the following claims.

What is claimed is:

1. Linear guide assembly comprising at least two guide rails, which are moveable in the longitudinal direction with respect to each other and have prismatic shaped raceways, a plurality of rolling elements guided in a cage, at least one gear wheel (10) for the positive guidance of the cage is connected to the cage, said gear wheel engaging in toothed racks, each of which is connected to a guide rail, said gear wheel (10) comprising a disk (11), at least one end surface of said disk having axial projections (13) distributed around the periphery, and rows of uniformly spaced recesses (16, 17, 18, 19) in said guide rails into which the projections (13) on the disk (11) can engage.

2. Linear guide assembly according to claim 1, characterized in that the axial projections (13) are provided near the outside circumference (12) of the disk (11).

3. Linear guide assembly according to claim 1, characterized in that the disk (11) is provided with teeth on a lateral surface thereof.

4. Linear guide assembly according to claim 1, characterized in that the axial projections (13) are designed as portions of a sphere.

5. Linear guide assembly according to claim 4, characterized in that the recesses (16, 17, 18, 19) in the guide rails (1, 2) are designed with a hollow, spherical form.

6. Linear guide assembly according to claim 1, characterized in that the recesses (16, 17, 18, 19) in the guide rails (1, 2) are provided over the entire length of the guide rails (1, 2).

7. Linear guide assembly according to claim 1, characterized in that the recesses (16, 17, 18, 19) are arranged on only part of the guide rails (1, 2).

8. Linear guide assembly according to claim 1, characterized in that the recesses (16, 17, 18, 19) in the guide rails are introduced by plastic deformation.

9. Linear guide assembly according to claim 1, characterized in that the recesses (16, 17, 18, 19) in the guide rails are introduced by a cutting operation.

10. Linear guide assembly according to claim 1, characterized in that the gear wheel (10) is inserted in one of the pockets (8) of the cage (9).

11. Linear guide assembly according to claim 1, characterized in that the gear wheel (10) is installed in a separate housing (20).

* * * * *